United States Patent [19]
Lovie

[11] Patent Number: 5,845,968
[45] Date of Patent: Dec. 8, 1998

[54] CHILD SAFETY SEAT

[75] Inventor: David Lovie, Andover, England

[73] Assignee: Britax Romer Kindersicherheit GmbH, Ulm, Germany

[21] Appl. No.: 3,063

[22] Filed: Jan. 5, 1998

[30] Foreign Application Priority Data

Jan. 9, 1997 [GB] United Kingdom .................. 9700351

[51] Int. Cl.$^6$ ........................................... A47C 1/08
[52] U.S. Cl. ................................. 297/256.1; 297/250.1
[58] Field of Search ................................. 297/254, 255, 297/250.1, 354.13, 353, 383, 188.08, 188.01, 256, 358, 256.1, 94, 105, 118, 283.1

[56] References Cited

U.S. PATENT DOCUMENTS

| | | | |
|---|---|---|---|
| 1,139,184 | 5/1915 | Johnson | 297/358 X |
| 1,936,973 | 11/1933 | Switzer | 297/354.13 |
| 2,557,874 | 6/1951 | Kailenta | 297/256 |
| 3,054,637 | 9/1962 | Pambello | 297/256 X |
| 4,461,510 | 7/1984 | Cunningham et al. | |
| 4,854,639 | 8/1989 | Burleigh et al. | |
| 5,054,857 | 10/1991 | Kvalheim | 297/423.13 |
| 5,524,964 | 6/1996 | Weimersheimer | 297/354.13 X |
| 5,678,887 | 10/1997 | Sher | 297/250.1 |

FOREIGN PATENT DOCUMENTS

| | | |
|---|---|---|
| 0 232 237 A2 | 8/1987 | European Pat. Off. . |
| 4305548 | 8/1994 | Germany .......................... 297/250.1 |
| 2 220 848 | 1/1990 | United Kingdom . |
| 2 256 364 | 12/1992 | United Kingdom . |

*Primary Examiner*—Milton Nelson, Jr.
*Attorney, Agent, or Firm*—Davis and Bujold

[57] ABSTRACT

A safety seat for enabling a child to use an adult vehicle seat belt has a seat portion and respective guides on each side of the seat portion for locating the lap portion of the adult seat belt. A backrest is movable between a deployed position in which it projects upwardly from a rear edge of the seat portion and a stowed position within the seat portion.

18 Claims, 6 Drawing Sheets

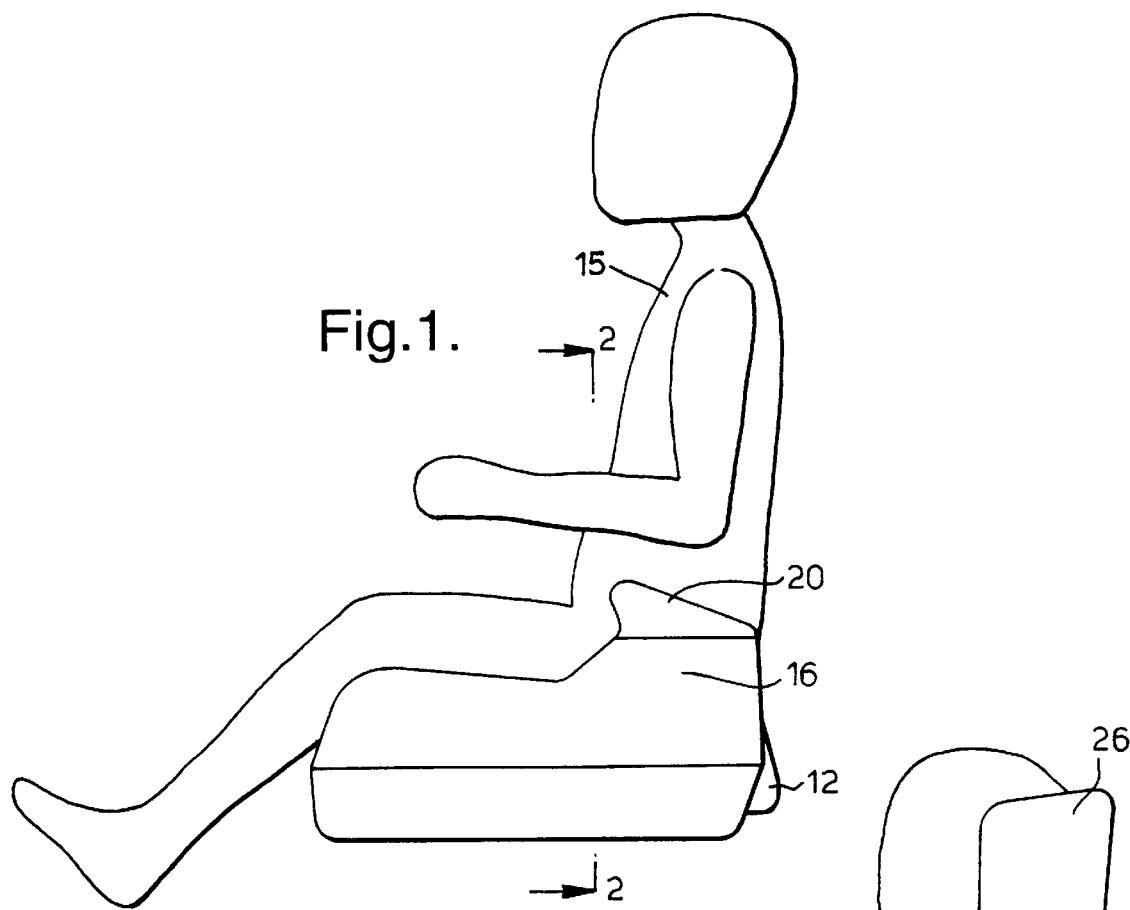
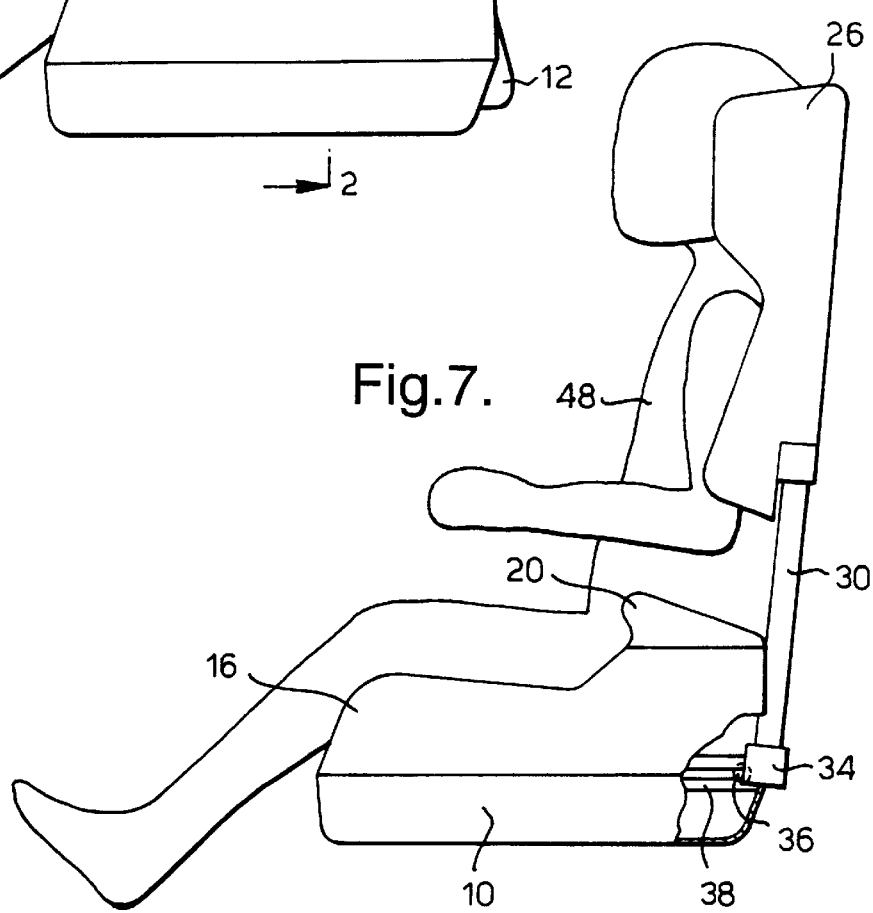

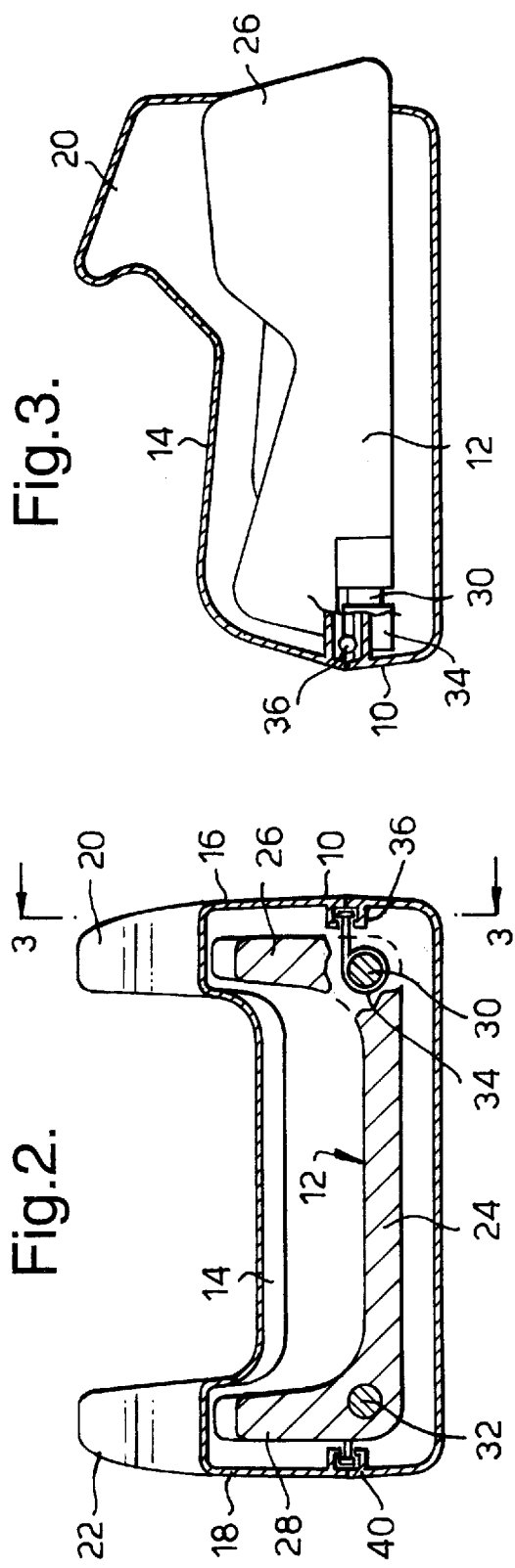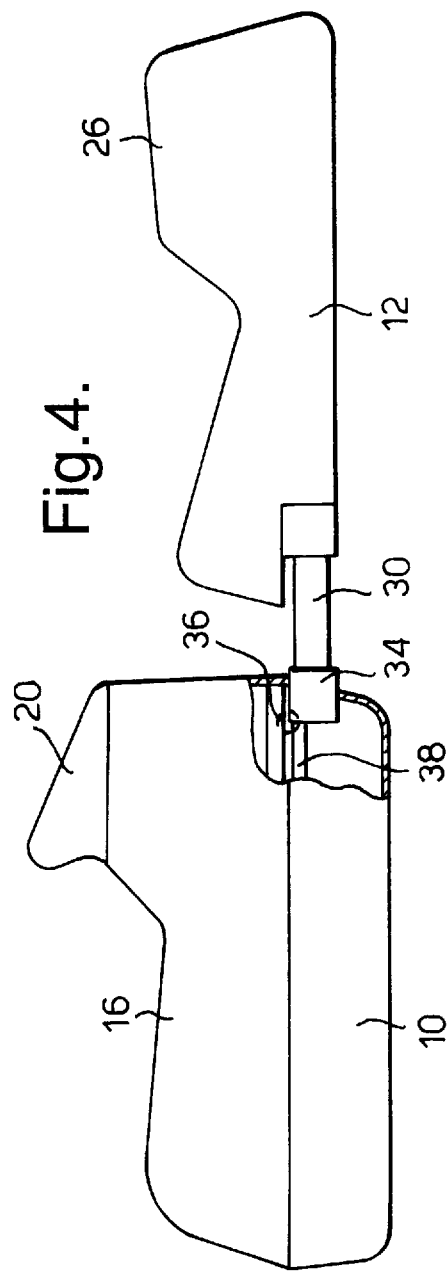

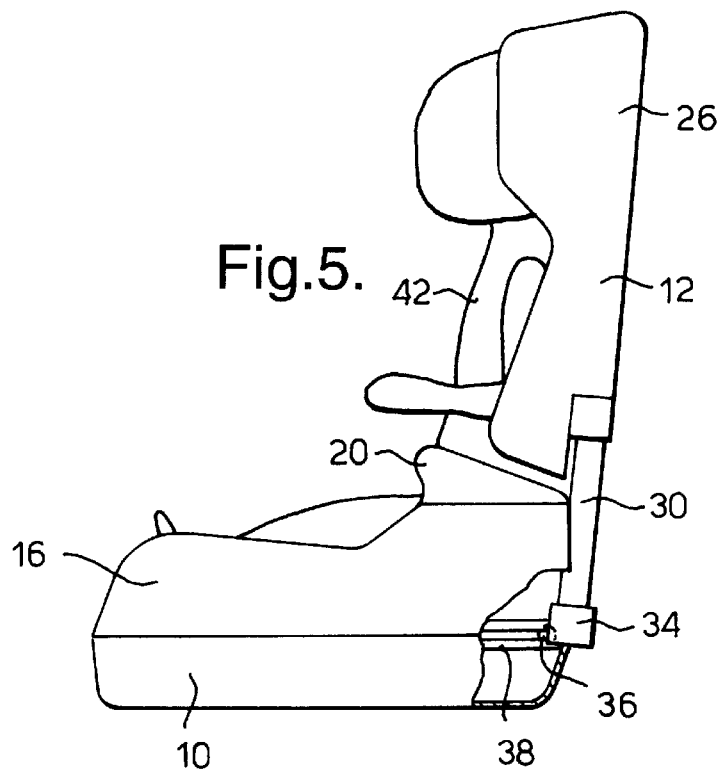
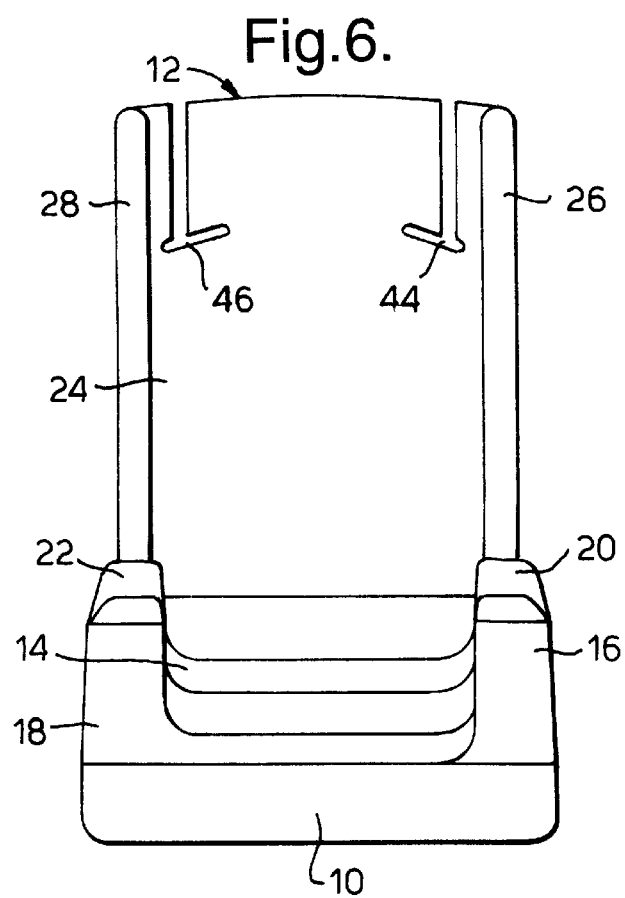

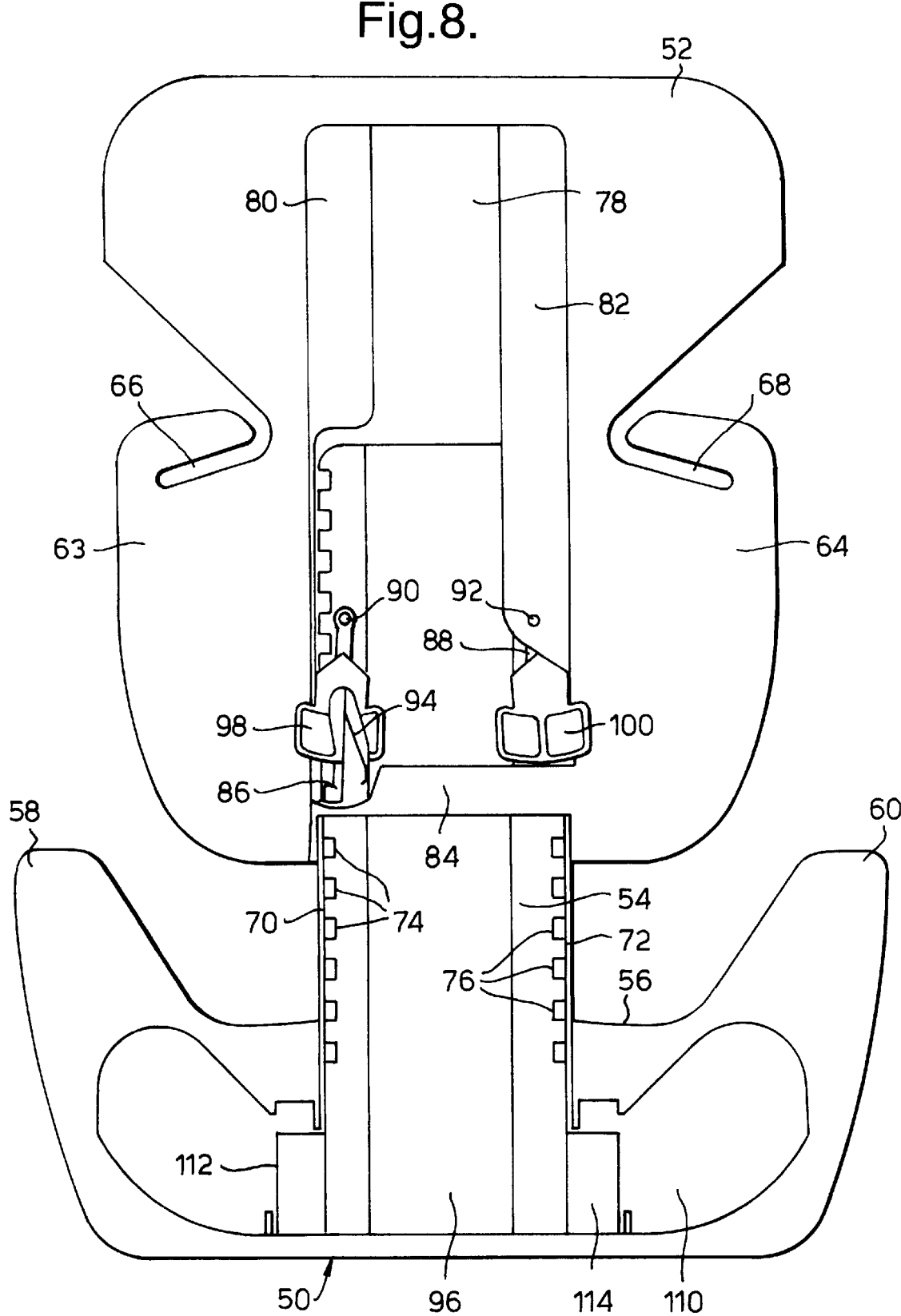

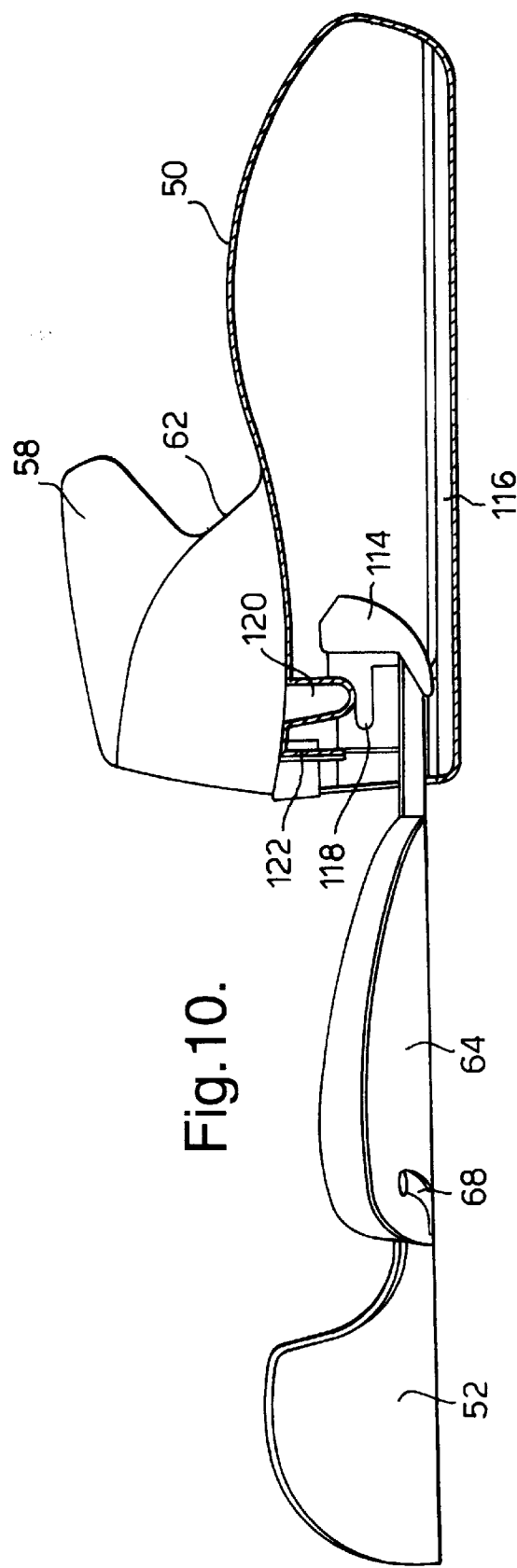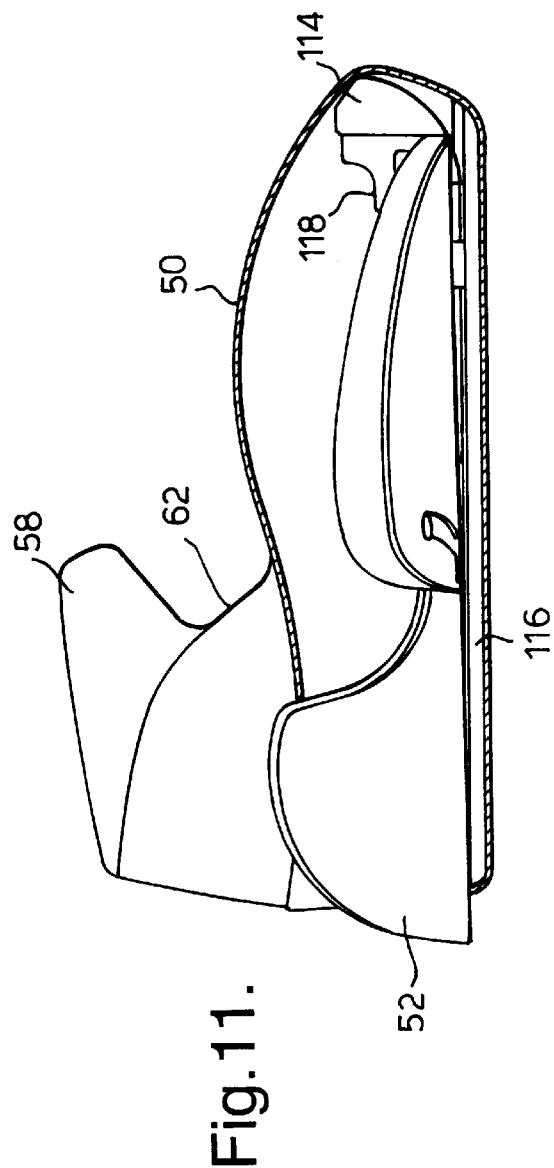

CHILD SAFETY SEAT

FIELD

This invention relates to a child safety seat of the type comprising a backrest and a seat portion having an upper surface. The invention is particularly, but not exclusively applicable to a safety seat for enabling a child to use an adult vehicle seat belt, respective guide means being provided on each side of the seat portion for locating the lap portion of the adult seat belt.

RELATED ART

U.S. Pat. No. 4,461,510 discloses a safety seat of this type for use by a child who is almost big enough to use an adult seat belt without the need for any child safety seat or the like. U.S. Pat. No. 4,854,639 discloses a safety seat of this type suitable for use by a smaller child.

In order to make provision for the carriage of children in taxis and hire cars, it is necessary for each vehicle to be provided with a variety of child safety seats for children of different age groups. Ideally, it should be possible to equip every passenger seat in a vehicle with a child safety seat suitable for all child age ranges. In practice, this is not feasible because it is also necessary to make provision for storage for all of such child safety seats when the vehicle is carrying adult passengers. It is an object of the present invention to provide a safety seat of the type described above suitable for children of a range of widely differing body sizes.

SUMMARY OF THE INVENTION

According to the invention, in a child safety seat of the type described above, the backrest is movable between a deployed position in which it projects upwardly from a rear edge of the seat portion and a stowed position within the seat portion.

In one form of the invention, the backrest is mounted on a support which is connected to the seat portion for relative sliding and angular movement.

Preferably, the backrest is slidably mounted on the support so that, when the backrest is in its deployed position, its height relative to the seat portion is adjustable.

BRIEF DESCRIPTION OF THE DRAWINGS

FIG. 1 is a side view of a child safety seat in accordance with a first embodiment of the invention, showing the child seat with the backrest in its stowed position, so that the seat portion can be used as a booster cushion;

FIG. 2 is a cross-sectional view on the line 2—2 in FIG. 1 but with the seat unoccupied;

FIG. 3 is a cross-sectional view on the line 3—3 in FIG. 2;

FIG. 4 is a side view of the child safety seat shown in FIGS. 1 to 3 with the backrest in an intermediate position between its deployed position and its stowed position;

FIG. 5 is a side view similar to FIG. 1, with its backrest deployed for use by a relatively small child;

FIG. 6 is a front view of the seat shown in FIG. 5 but without a child occupant;

FIG. 7 is a side view, similar to FIG. 5 but with the backrest raised for use by a larger child;

FIG. 8 is a rear view of a seat in accordance with a second embodiment of the invention with the backrest in its deployed position;

FIG. 10 is a lateral sectional view of the seat shown in FIGS. 8 and 9 with the backrest in an intermediate position between its deployed position and its stowed position; and FIG. 11 is a lateral sectional view, similar to FIG. 10, but with backrest in its fully stowed position.

DETAILED DESCRIPTION OF THE PREFERRED EMBODIMENT

Figure 9:
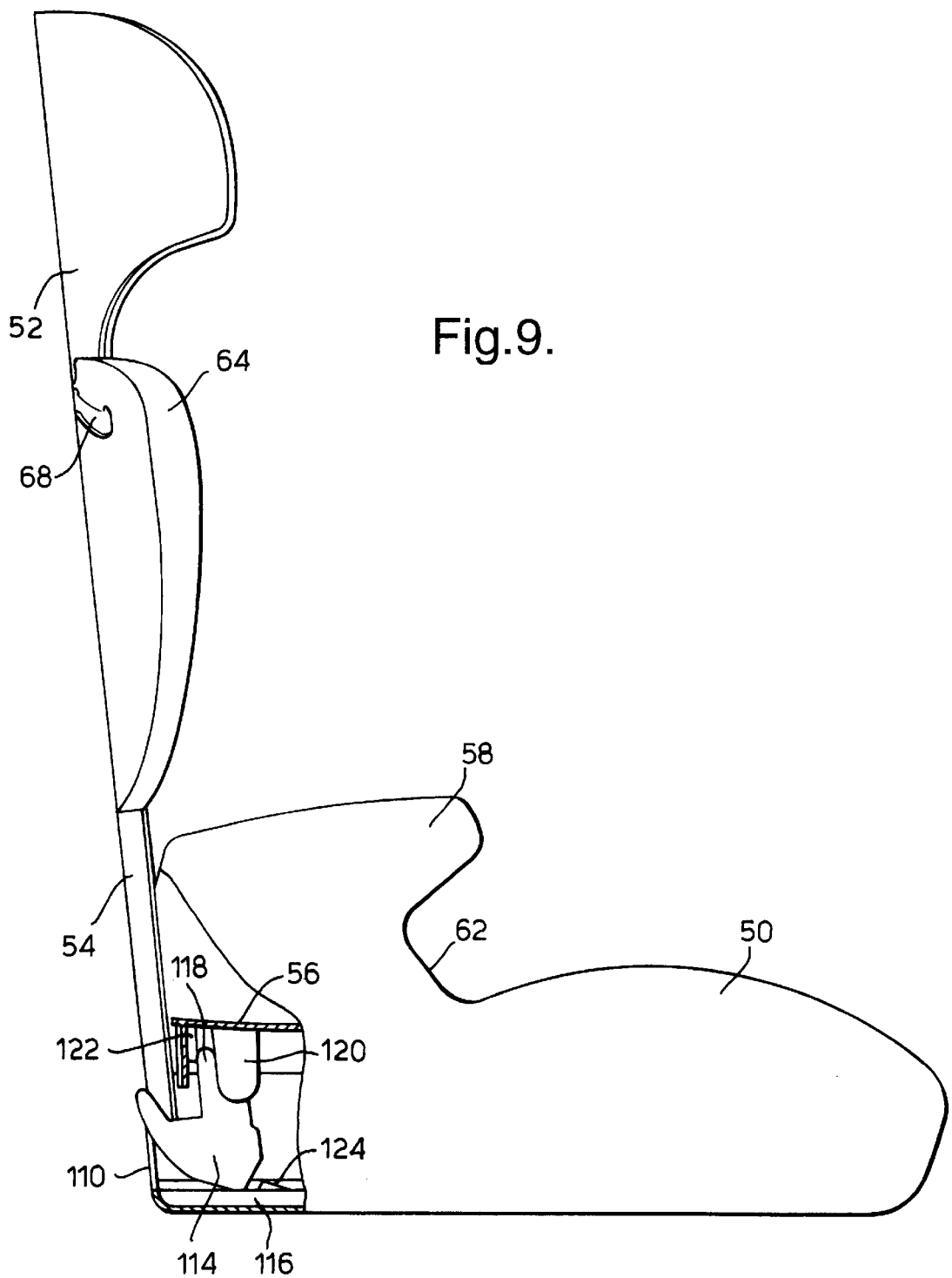
FIG. 9 is a partially broken-away side view of the seat shown in FIG. 8.

FIGS. 1 to 3 show a safety seat comprising a seat portion 10 in the form of a booster cushion and a backrest 12 stowed within the interior of the seat portion 10. The seat portion 10 has a seating surface 14 for a child 15. Side walls 16 and 18 project upwardly on each side of the seat portion 10, the rear ends of which have upstanding projections 20 and 22 with hook-like formations on their front edges to serve as guides for an adult lap belt (not shown).

The backrest 12 consists of a central portion 24 which, in its stowed position, is accommodated under the seating surface 14, and two side wings 26 and 28 which are accommodated within the side walls 16 and 18 of the seat portion 10. The backrest 12 is slidably mounted on two guide rods 30 and 32 which have their left-hand ends (as viewed in FIG. 3) secured to a transverse member 34 which is pivotally connected to a pair of sliders 36, each of which engages in a respective guide track 38, 40 (FIG. 2) on the inside of the outer wall of respective side walls 16 and 18 of the seat portion 10.

When the backrest 12 is to be moved to its deployed position, it is first pulled out of rear of the seat portion 10, the transverse member 34 and the sliders 36 moving to the rear end of the tracks 38 and 40 and the backrest being pulled outwardly on the guide rods 30, to the position shown in FIG. 4. Next, the backrest 12 is pivoted to the position shown in FIGS. 5 and 6. It is then in a position suitable for use by a small child 42. A slot 44 in the central portion 24 of the backrest 12 serves as belt guide for guiding an adult shoulder belt over the left shoulder of the child 42. A similar slot 46 is provided on the other side of the central portion 24 for use with an adult shoulder belt intended to extend over the child's right shoulder.

As shown in FIG. 7, the backrest 12 may be moved further up the guide rods 30 and 32 so as to bring the adult shoulder belt guide 44 to a height suitable to guide an adult shoulder belt over the shoulder of a larger child 48.

FIGS. 8 and 9 show a safety seat similar to the seat shown in FIGS. 1–7, comprising a booster cushion 50 and a backrest 52 which is connected to the booster cushion 50 by a backrest support member 54.

The booster seat has seating surface 56 with side walls 58 and 60, the rear ends of which have upstanding projections to serve as guides 62 for an adult lap belt (not shown).

The backrest 52 includes the side wings 63 and 64 with belt guides 66 and 68 before an adult shoulder belt, only one such guide being used on any one occasion.

The backrest support member 54 is of U-shaped cross-section, each side limb 70, 72 of which has a respective series of rectangular detent teeth 74, 76 on its inwardly facing surface. The upper end of the support member 54 is a sliding fit within a correspondingly shaped channel 78 in the backrest 52, the channel 78 having flanges 80 and 82 overlying the rearward edges of the side walls 70 and 72, respectively. Below the flanges 80 and 82, the backrest also has a bridge portion 84 which extends behind the support member 54.

A respective locking pawl 86, 88 is mounted on a pivot pin 90, 92 extending between the corresponding flange 80, 82 and the main part of the backrest 52. Each pawl 86, 88 is spring-biassed by a leaf spring 94 (only one of which is visible in FIG. 8) into engagement with the corresponding series of teeth 74, 76. The leaf springs 94 engage with a central rib 96 of the backrest support member 54. The two pawls 86, 88 have respective finger grips 98 and 100 which can be squeezed together to cause disengagement of the pawls 86, 88 from the detent teeth 74, 76 to allow the backrest 52 to slide up and down the backrest support member 54. When the finger grips 98 and 100 are released, the pawls 86 and 88 engage with selected teeth 74, 76 to secure the backrest 52 at the chosen height.

The booster cushion 50 has an opening 110 in its rear face. The bottom end of the backrest support member has two side cam members 112 and 114 which extend into the opening 110 with their respective arcuate surfaces resting on a central longitudinally extending rib 116. Each cam portion 112, 114 has an upstanding finger 118 which engages between downwardly projecting fingers 120 and 122 which are secured to the inner surface of the seating portion 56 of the booster cushion 50. The bottom of the finger 120 is of convex arcuate shape and is engaged by a complimentary concave arcuate surface on the finger 118. Consequently, when the backrest 52 and its support member 54 are held in the orientation shown in FIG. 9 by abutment against a vehicle seat backrest (not shown), engagement of the finger 118 between the two fingers 120 and 122 on the booster cushion 50 prevents separation of the backrest support member 54 from the booster cushion. A spring-loaded detent 124 can be engaged by the cam members 112 and 114 to hold the backrest 52 in an orientation which is only slightly less upright than that illustrated in FIG. 9 to facilitate installation of the safety seat on a vehicle seat.

When the safety seat is not in use, or when it is desired to use the booster cushion 50 without the backrest 52, the backrest 52 and its support member can be stowed within the booster cushion 50. First, the finger grips 98 and 100 are pressed together to disengage the pawls 86 and 88 and the backrest 52 is slid down to its lowest possible position on the backrest support member 54. Next, the backrest support member is pivoted rearwardly, depressing the spring-loaded 124 until it reaches the horizontal orientation shown in FIG. 10. During this movement, the concave arcuate surface of the finger 118 slides round the convex bottom end of the finger 120. Finally, the backrest is slid inwardly through the opening 110 in the back of the booster cushion 50 until the members 112 and 114 abut against the inner surface of the front of the booster cushion 50 as shown in FIG. 11.

I claim:

1. A child safety seat comprising:
   a seat portion having an upper surface and a slide guide below said upper surface;
   a slider slidably mounted in said slide guide;
   a support pivotally mounted on said slider so as to be movable between a deployed position in which it projects upwardly from a rear edge of the seat portion and a stowed position below the upper surface of the seat portion; and
   a backrest slidably mounted on the support for movement thereon between a position in which it projects upwardly therefrom when said support is in its deployed position, and a position in which it is stowed within the seat portion below the upper surface thereof when the support is in its stowed position.

2. A safety seat according to claim 1, further comprising a releasable detent on the backrest adapted to engage with complementary formations on the support to secure the backrest at a desired height relative to the seat portion.

3. A safety seat according to claim 1, further comprising respective guide means on each side of the seat portion for locating a lap portion of a vehicle seat belt.

4. A safety seat according to claim 1, wherein the support has a cam formation adapted to engage with a complementary formation on the seat portion to control angular movement of the support relative to the seat portion when the support is protracted to its maximum extent.

5. A child safety seat comprising:
   a seat portion having an upper surface;
   a support connected to the seat portion for relative sliding and angular movement; and
   a backrest which is slidably mounted on the support so as to be movable between a deployed position in which it projects upwardly from a rear edge of the seat portion and a stowed position within the seat portion below the upper surface thereof.

6. A safety seat according to claim 5, further comprising respective guide means on each side of the seat portion for locating a lap portion of a vehicle seat belt.

7. A safety seat according to claim 5, wherein the support is pivotally connected to the seat portion.

8. A safety seat according to claim 5, wherein the support has a cam formation adapted to engage with a complementary formation on the seat portion to control angular movement of the support relative to the seat portion when the support is protracted to its maximum extent.

9. A safety seat according to claim 8, further comprising respective guide means on each side of the seat portion for locating a lap portion of a vehicle seat belt.

10. A safety seat according to claim 8, wherein the backrest is slidably mounted on the support so that, when the backrest is in its deployed position, its height relative to the seat portion is adjustable.

11. A safety seat according to claim 10, further comprising a releasable detent on the backrest adapted to engage with complementary formations on the support to secure the backrest at a desired height relative to the seat portion.

12. A child safety seat comprising:
    a seat portion having an upper surface;
    a support connected to the seat portion for relative sliding and angular movement; and
    a backrest slidably mounted on the support so as to be movable between a deployed position in which it projects upwardly from a rear edge of the seat portion and a stowed position below the upper surface of the seat portion, and so that, when the backrest is in its deployed position, its height relative to the seat portion is adjustable.

13. A safety seat according to claim 12, further comprising a releasable detent on the backrest adapted to engage with complementary formations on the support to secure the backrest at a desired height relative to the seat portion.

14. A safety seat according to claim 12, further comprising a releasable detent on the backrest adapted to engage with complementary formations on the support to secure the backrest at a desired height relative to the seat portion.

15. A safety seat according to claim 12, wherein the support has a cam formation adapted to engage with a complementary formation on the seat portion to control angular movement of the support relative to the seat portion when the support is protracted to its maximum extent.

16. A safety seat according to claim 15, further comprising respective guide means on each side of the seat portion for locating a lap portion of a vehicle seat belt.

17. A safety seat according to claim 12, further comprising respective guide means on each side of the seat portion for locating a lap portion of a vehicle seat belt.

18. A safety seat according to claim 17, wherein the backrest is slidably mounted on the support so that, when the backrest is in its deployed position, its height relative to the seat portion is adjustable.

* * * * *